(No Model.)

J. D. PRESCOTT.
WHEEL FOR BICYCLES.

No. 585,286.  Patented June 29, 1897.

Witnesses.  
Robert Everitt.  
Thos. A. Green.

Inventor.  
Joseph D. Prescott.  
By James L. Norris.  
Atty.

UNITED STATES PATENT OFFICE.

JOSEPH D. PRESCOTT, OF BOSTON, MASSACHUSETTS.

WHEEL FOR BICYCLES.

SPECIFICATION forming part of Letters Patent No. 585,286, dated June 29, 1897.

Application filed September 29, 1896. Serial No. 607,330. (No model.)

*To all whom it may concern:*

Be it known that I, JOSEPH D. PRESCOTT, a citizen of the United States, residing at Boston, in the county of Suffolk and State of Massachusetts, have invented new and useful Improvements in Wheels for Bicycles and other Vehicles, of which the following is a specification.

This invention relates to wheels for bicycles and other vehicles, and has for its object to provide improved means for absorbing the vibrations communicated to the wheels by inequalities or unevenness of the roadway traveled upon and to prevent the transmission of such vibrations to the frame of the bicycle and through the frame to the rider's seat and pedals.

It also has for its object to embody the mechanism for accomplishing this object in a simple and compact structure that may be readily applied to the frames of any of the ordinary or well-known makes of machines now in use or on the market, and which may also be employed in connection with any of the well-known types of wheels used in bicycle manufacture.

To these ends my invention consists in the features and in the construction or arrangement of parts hereinafter described, and specifically pointed out in the claims following the description, reference being had to the accompanying drawings, forming a part of this specification, wherein—

Figure 1:
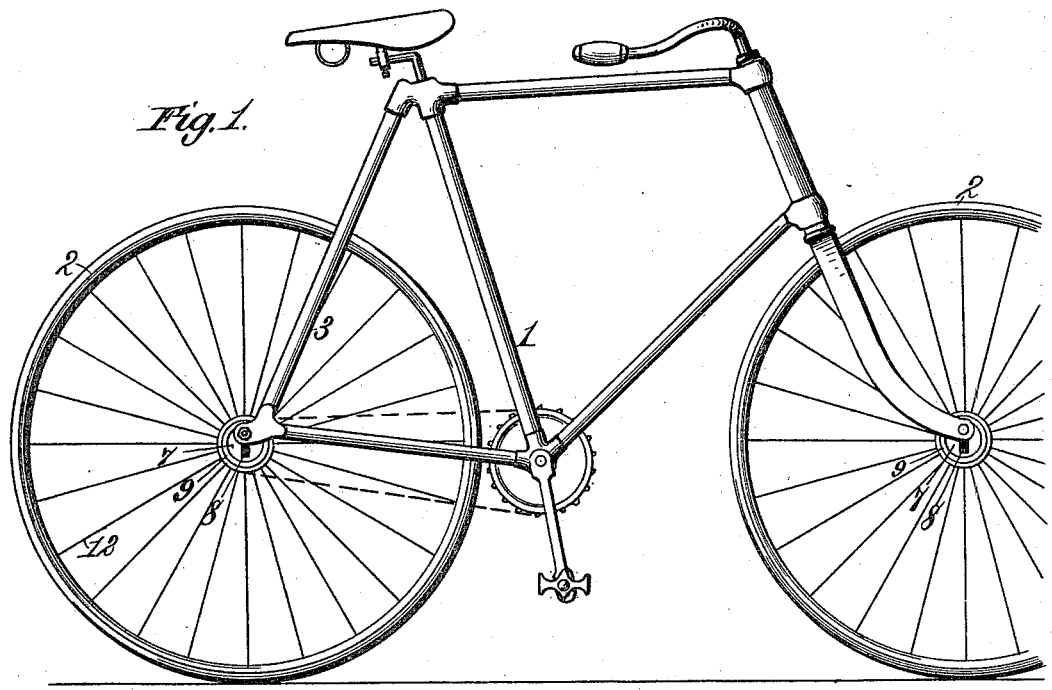
Figure 2:
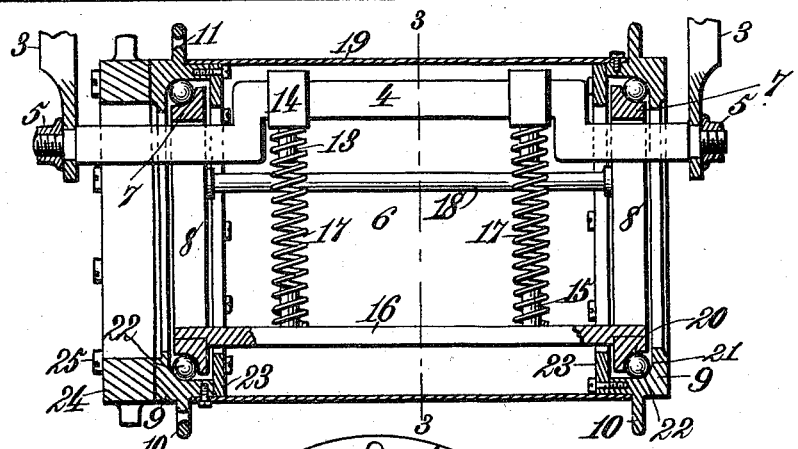
Figure 3:
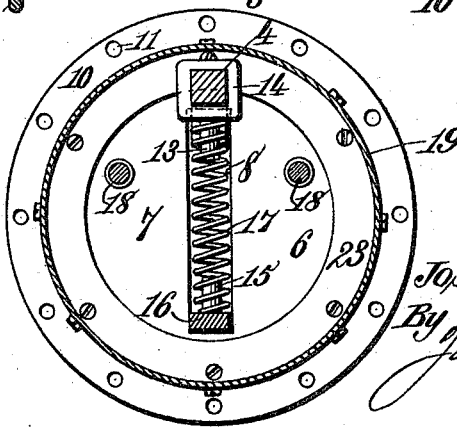

Figure 1 is a side elevation of a bicycle, shown partly in dotted lines, equipped with my improvements. Fig. 2 is a central longitudinal section taken through the center of the hubs of one of the wheels, and Fig. 3 is a transverse section taken on the line 3 3 of Fig. 2.

Referring to the drawings, the numeral 1 indicates the frame of a bicycle of ordinary or any preferred construction, and 2 the wheels thereof. The wheels may also be of any of the well-known makes now in use, excepting the hub portion and axle, and it is in these portions of the bicycle that my invention is comprised. In describing my invention I will refer to the rear or driving wheel.

In the lower ends of the rear fork 3 of the frame is rigidly secured a shaft 4. Said shaft is preferably square in cross-section and is secured in place by nuts 5, tapped over its ends in the same manner in which the axles of bicycles are usually attached to the forks. Arranged on the shaft 4 is an axle 6, consisting of two disks 7 7, each having a vertical slot 8 extending through its center and to near opposite points on its periphery. The shaft 4 passes through said slots, and said shaft and slots are of such relative size as to permit the free vertical movement of the shaft within the slots; but owing to the cross-sectional shape of the shaft the disks constituting the axle can have no rotary movement. Rotatably mounted on each of the disks 7 is a hub-section 9, having formed on its periphery an annular flange 10, provided with a series of perforations 11, through which pass and are secured the wheel-spokes 12 in a usual and well-known manner.

Mounted on the shaft 4 intermediate the disks 7 7 are two guide-stems 13, each of said stems projecting vertically downward and held in position by bosses 14, which are provided with square apertures through which the correspondingly-shaped shaft 4 passes, whereby the stems are prevented from having any movement about the shaft as a center. Two corresponding guide-stems 15 project upward from a cross-bar 16, attached at its opposite ends to the disks 7 7 at or near the lower ends of the slots 8, the guide-stems 15 being in alinement with the guide-stems 13, as shown. Arranged over the guide-stems 13 and 15 are coiled springs 17, which exert a constant force to raise the shaft 4. In addition to the cross-bar 16 the disks 7 7 are further connected and braced together by cross-braces 18, attached at their opposite ends to said disks, said cross-bar and cross-braces serving to rigidly connect the disks together and form in effect a single axle about which the hub-sections 9 are adapted to rotate.

Over the inner ends of the hub-sections 9 is fastened, by machine-screws or in other suitable manner, a thin metallic cylinder 19, which operates to rigidly connect said hub-sections together and form in effect a single hub and also serves to inclose the parts and prevent the entrance of dirt and the like.

In order to reduce the friction between the hubs and the axle to a minimum, I prefer to construct them as follows: The periphery of each of the disks 7 7 is formed in the shape of a concave cone, as at 20, (see Fig. 2,) and the inner circumference of the hub-section 9 is of a corresponding shape, as at 21, and in the groove thus formed are disposed antifriction-balls 22, by means of which a rolling or ball bearing is provided for the hub on its axle. The hub-sections 9 are retained in place on the axle by annular bands or washers 23, which are attached to the inner faces of the hub-sections by machine-screws or other suitable fastenings and project beyond the peripheries of the disks 7 7.

A sprocket-wheel 24 is attached by bolts 25 to the outer face of one of the hub-sections 9, as most clearly shown in Fig. 2, and is adapted to be engaged by the drive-chain in the usual manner.

The hub and axle of the forward wheel are constructed in the manner above described, excepting that the sprocket-wheel is omitted and the shaft 4 consequently made somewhat shorter.

The operation of my improved wheel will be readily understood by those skilled in the art. The springs 17 yield beneath the weight of the rider and permit the shafts 4 to have a free vertical movement in the slotted disks comprising the axle, and the vibrations communicated to the wheels by inequalities or irregularities of the roadway are absorbed by the springs and the transmission of the same to the frame of the bicycle is thus prevented. In this manner an easy, comfortable, and elastic seat is provided for the rider and a like support afforded for his feet on the pedals. Owing to the disks composing the axle being fixed, the hub rotates about a fixed center and thus the axis of rotation is always in the true center of the wheel, the shaft 4 yielding in the axle and the latter having no yielding movement at all.

It will be evident that wheels equipped with my improvements may be readily applied to the frames of any of the well-known or ordinary bicycles now in use, it being merely necessary to insert the shafts 4 in the forks of the machine in place of the axles usually employed. My improved hub and axle may also be employed with the wheels now in use and on the market, it being only necessary to remove the ordinary hubs from the spokes and substitute therefor my improved hub and axle and attach to the flanges of the hub-sections the ends of the spokes in the usual manner.

I have shown and described two coiled springs for each hub and axle, but it will be evident that one spring or several springs may be employed without departing from the spirit of my invention. It will also be evident that in place of the coiled springs shown any other form of spring may be employed.

The pneumatic tires now in such general use may be dispensed with in bicycles provided with my improved axles and hubs, and solid tires or tires of ordinary construction may be used in their place, as all the useful purposes accomplished by pneumatic tires are also accomplished by my improvements, while at the same time the initial increased cost of such tires, the danger of their being punctured, and their rapid wear and early complete destruction are avoided.

I have described my invention as being applied to bicycles, but it will be manifest that wheels constructed in accordance therewith may be employed in connection with vehicles of every description.

I have shown the shaft cranked, but if preferred it may be made straight.

Having described my invention, what I claim is—

1. In a wheel hub and axle, the combination with two slotted disks 7 rigidly connected together, of hub-sections 9 rotatably mounted on said disks, a square shaft 4 passing through said slotted disks and vertically movable therein, means for rigidly attaching said shaft to the frame of a vehicle, means for rigidly connecting the hub-sections together, and a spring yieldingly supporting the shaft in the slotted disks, substantially as described.

2. In a wheel hub and axle, the combination with two slotted disks 7, of a hub rotatably mounted on said disks, a square shaft 4 passing through said slotted disks, and vertically movable therein, means for rigidly attaching said shaft to the frame of a vehicle, guide-stems 13 fixed on the shaft, a cross-bar 16 attached at its opposite ends to the said disks, guide-stems 15 carried by said cross-bar, and coiled springs arranged on said guide-stems, substantially as described.

3. In a wheel hub and axle, the combination with two slotted disks 7 rigidly connected together, of hub-sections 9 rotatably mounted on said disks, antifriction-balls 22 disposed between said disks and hub-sections, means for rigidly connecting together respectively the disks and hub-sections, a shaft 4 passing through said slotted disks and vertically movable therein, and a spring yieldingly supporting the shaft in the slotted disks, substantially as described.

In testimony whereof I have hereunto set my hand in presence of two subscribing witnesses.

JOSEPH D. PRESCOTT.

Witnesses:
JAMES L. NORRIS,
THOS. A. GREEN.